United States Patent
Im et al.

(10) Patent No.: US 9,459,485 B2
(45) Date of Patent: Oct. 4, 2016

(54) ARRAY SUBSTRATE COMPRISING OPTICAL DIFFUSION STRUCTURES HAVING DIFFERENT REFLECTIVITIES FOR LIGHT REFLECTED FROM DIFFERENT PIXEL REGIONS AND LIQUID CRYSTAL DISPLAY APPARATUS

(71) Applicant: BOE TECHNOLOGY GROUP CO., LTD., Beijing (CN)

(72) Inventors: Yun Sik Im, Beijing (CN); Jung Mok Jun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 44 days.

(21) Appl. No.: 13/995,597

(22) PCT Filed: Nov. 15, 2012

(86) PCT No.: PCT/CN2012/084702
§ 371 (c)(1),
(2) Date: Jun. 19, 2013

(87) PCT Pub. No.: WO2014/019299
PCT Pub. Date: Feb. 6, 2014

(65) Prior Publication Data
US 2014/0055729 A1   Feb. 27, 2014

(30) Foreign Application Priority Data

Jul. 31, 2012  (CN) .......................... 2012 1 0270446

(51) Int. Cl.
G02F 1/1335  (2006.01)
G02B 5/02  (2006.01)

(52) U.S. Cl.
CPC ... *G02F 1/133504* (2013.01); *G02F 1/133514* (2013.01); *G02F 1/133555* (2013.01); *G02B 5/0215* (2013.01)

(58) Field of Classification Search
USPC .................................................. 349/106, 114
See application file for complete search history.

(56) References Cited

U.S. PATENT DOCUMENTS

| 2002/0167743 A1 | 11/2002 | Matsuo et al. |
| 2003/0142247 A1* | 7/2003 | Nishiyama et al. ............ 349/67 |
| 2003/0161940 A1* | 8/2003 | Wei ...................... G02B 5/0221 427/58 |

FOREIGN PATENT DOCUMENTS

| CN | 1700066 A | 11/2005 |
| CN | 101261406 A | 9/2008 |

(Continued)

OTHER PUBLICATIONS

First Chinese Office Action dated May 30, 2014; Appln. No. 201210270446.7.
International Search Report dated Sep. 5, 2013 PCT/CN2012/084702.

(Continued)

*Primary Examiner* — Lauren Nguyen
(74) *Attorney, Agent, or Firm* — Ladas & Parry LLP

(57) ABSTRACT

There are provided an array substrate and a liquid crystal display apparatus. The array substrate comprises: array structures (12) and pixel electrodes (13) that are formed on a first substrate (11); wherein at least part of pixel regions corresponding to the pixel electrodes (13) are in optical diffusion structures (14); the pixel regions include pixel regions corresponding to pixels of different colors; the optical diffusion structures (14) are so arranged that reflectivity of light reflected from an optical diffusion structure of a pixel region, which corresponds to a pixel of a color having the longest light wavelength, is lower than reflectivity of light reflected from an optical diffusion structure (14) of a pixel region, which corresponds to a pixel of another color.

12 Claims, 2 Drawing Sheets

(56) References Cited

FOREIGN PATENT DOCUMENTS

| JP | 2002-287130 A | 10/2002 |
|----|---------------|---------|
| JP | 2006-154583 A | 6/2006  |
| JP | 2011-008295 A | 1/2011  |

OTHER PUBLICATIONS

Second Chinese Office Action dated Feb. 13, 2015; Appln. No. 201210270446.7.

* cited by examiner

ARRAY SUBSTRATE COMPRISING OPTICAL DIFFUSION STRUCTURES HAVING DIFFERENT REFLECTIVITIES FOR LIGHT REFLECTED FROM DIFFERENT PIXEL REGIONS AND LIQUID CRYSTAL DISPLAY APPARATUS

TECHNICAL FIELD

Embodiments of the present invention relate to an array substrate and a liquid crystal display apparatus.

BACKGROUND

Display panels used in cell phone products at present are mainly thin film transistor liquid crystal displays (TFT-LCDs). Notebooks, monitors, televisions and other products mostly adopt display panels for indoor use, and thus TFT-LCD products of transmissive type are mostly used. However, the cell phone products are not only used indoors but also used outdoors. In order to meet the demand characteristics of indoor/outdoor dual-usage, a transflective technology is often employed. The transflective technology refers to such a technology that one portion of a pixel is a reflective region, and another portion of it is a transmissive region. Display panels prepared in the transflective technology are suitable for either indoor or outdoor usage.

As shown in FIG. 1, an array substrate of an existing transflective liquid crystal display panel comprises a glass substrate 1, on which a TFT device 8 is provided. The TFT device 8 includes a gate electrode 2, a source electrode 81 and a drain electrode 82, between the source electrode 81 and the drain electrode 82, there is provided an active layer 4, and on the source electrode 81 and the drain electrode 82, there are formed a passivation layer 7 and a pixel electrode layer 15. On a part of the pixel electrode layer 15, there is a resin layer 9, and on a surface of the resin layer 9, there is formed an embossing structure 52 with a metal layer possessing a reflective property coated thereon. The resin layer 9 and the metal layer possessing the reflective property form a reflective layer 5 capable of reflecting external light. A region in another part of the pixel electrode layer 15 without the coated resin layer 9 forms a transmissive region. A reflective surface formed by the embossing structure 52 has a good diffusion property, allows light to be reflected to liquid crystals and gives rise to a wider angle scope in front of the display screen.

FIG. 2 is a schematic view showing the state of liquid crystal molecules of the display panel shown in FIG. 1 in the case of white grayscale, and FIG. 3 is a schematic view showing the state of liquid crystal molecules of the display panel shown in FIG. 1 when they are changed from the state of white grayscale shown in FIG. 2 into a medium grayscale;

The display panel in FIG. 2 and the display panel in FIG. 3 each include an array substrate 21 and a color filter (CF) substrate 22 that is cell-assembled with the array substrate, and liquid crystals is filled between the array substrate and the CF substrate. When liquid crystal molecules are changed from white grayscale (as shown in FIG. 2) into the medium grayscale (as shown in FIG. 3), the anisotropy of refractivity of liquid crystals becomes larger, and meanwhile the transmittance of light having a longer wavelength passing through red pixels is also increased. Thus, ideal white is not obtained, and a phenomenon of yellowish occurs; that is, a phenomenon of color deviation takes place. This degrades the quality of picture of the display panel. Liquid crystal display panels of total-reflective type suffer from a similar problem.

Grayscale herein generally means that each of sub-pixels shows different levels of brightness. A point on a liquid crystal screen as seen by naked eyes of people, i.e., a pixel consists of three sub-pixels, which are red, green, blue (RGB) sub-pixels. Grayscale represents the deferent levels of brightness from the darkest to the brightest for a picture. The more the intermediate hierarchical levels are, the more delicate the picture effect can be presented. Each pixel on the LCD screen is combined by red, green, and blue sub-pixels at different brightness levels, and eventually different color points are formed. That is to say, the color change of each point on the screen is actually caused by the grayscale change of three RGB sub-pixels constituting this pixel point.

SUMMARY

Embodiments of the present invention provide an array substrate and a liquid crystal display apparatus, capable of reducing or eliminating a phenomenon of color deviation that occurs in medium grayscale state to improve picture quality of the display apparatus.

According to an embodiment of the invention, there is provided an array substrate, comprising: a first substrate and array structures and pixel electrodes that are formed on the first substrate; wherein at least part of pixel regions corresponding to the pixel electrodes are in optical diffusion structures; the pixel regions include pixel regions corresponding to pixels of different colors; the optical diffusion structures are so arranged that reflectivity of light reflected from an optical diffusion structure of a pixel region, which corresponds to a pixel of a color having the longest light wavelength, is lower than reflectivity of light reflected from an optical diffusion structure of a pixel region, which corresponds to a pixel of another color.

As to the array substrate, for example, the optical diffusion structure of the pixel region which corresponds to a pixel of another color is so arranged that reflectivity of light reflected from an optical diffusion structure of a pixel region, which corresponds to a color pixel with a first light wavelength, is lower than reflectivity of light reflected from an optical diffusion structure of a pixel region, which corresponds to a color pixel with other light wavelength, wherein the first light wavelength is larger than the other light wavelength.

As to the array substrate, for example, the optical diffusion structures are embossing structures.

As to the array substrate, for example, the pixel regions include a red pixel region, a blue pixel region and a green pixel region; and a protruding angle of an embossing structure in the red pixel region is smaller than a protruding angle of an embossing structure in the blue pixel region and a protruding angle of an embossing structure in the green pixel region, respectively.

As to the array substrate, for example, the protruding angle of the embossing structure of the red pixel region may be in the range of 1 degree to 7 degrees.

As to the array substrate, for example, the protruding height of the embossing structure of the red pixel region may be in the range of 1.5 micrometers to 3.5 micrometers.

As to the array substrate, for example, the protruding angle of the embossing structure of the blue pixel region is larger than or equal to the protruding angle of the embossing structure of the green pixel region.

As to the array substrate, for example, protruding angles of embossing structures for the blue pixel region and the green pixel region each can be in the range of 5-13 degrees.

According to another embodiment of the invention, there is further provided a liquid crystal display apparatus, comprising: an array substrate, a color filter substrate cell-assembled with the array substrate, and a liquid crystal layer located between the array substrate and the color filter substrate, the array substrate comprising a first substrate and array structures and pixel electrodes that are formed on the first substrate; wherein at least part of pixel regions corresponding to the pixel electrodes are in optical diffusion structures; the pixel regions include pixel regions corresponding to pixels of different colors; the optical diffusion structures are so arranged that reflectivity of light reflected from an optical diffusion structure of a pixel region, which corresponds to a pixel of a color having the longest light wavelength, is lower than reflectivity of light reflected from an optical diffusion structure of a pixel region, which corresponds to a pixel of another color.

As to the liquid crystal display apparatus, for example, the optical diffusion structure of the pixel region which corresponds to a pixel of another color is so arranged that reflectivity of light reflected from an optical diffusion structure of a pixel region, which corresponds to a color pixel with a first light wavelength, is lower than reflectivity of light reflected from an optical diffusion structure of a pixel region, which corresponds to a color pixel with other light wavelength, wherein the first light wavelength is larger than the other light wavelength.

As to the liquid crystal display apparatus, for example, the optical diffusion structures may be embossing structures.

As to the liquid crystal display apparatus, for example, the pixel regions include a red pixel region, a blue pixel region and a green pixel region; and a protruding angle of an embossing structure of the red pixel region is smaller than a protruding angle of an embossing structure of the blue pixel region and a protruding angle of an embossing structure of the green pixel region, respectively.

As to the liquid crystal display apparatus, for example, the protruding angle of the embossing structure of the red pixel region may be in the range of 1 degree to 7 degrees.

As to the liquid crystal display apparatus, for example, the protruding height of the embossing structure of the red pixel region may be in the range of 1.5 micrometers to 3.5 micrometers.

As to the liquid crystal display apparatus, for example, the protruding angle of the embossing structure of the blue pixel region is larger than or equal to the protruding angle of the embossing structure of the green pixel region.

As to the liquid crystal display apparatus, for example, protruding angles of embossing structures for the blue pixel region and the green pixel region each can be in the range of 5-13 degrees.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the present invention, but not limitative of the present invention.

DETAILED DESCRIPTION

Figure 1:
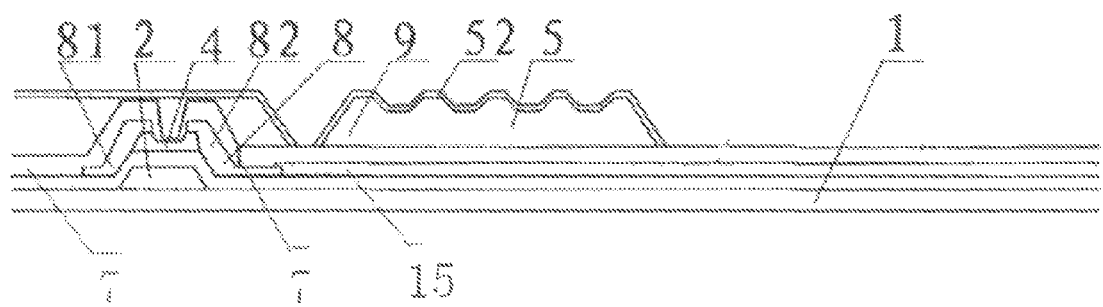
FIG. 1 is a structurally schematic view showing an array substrate of an existing transflective liquid crystal display panel.
Figure 2:
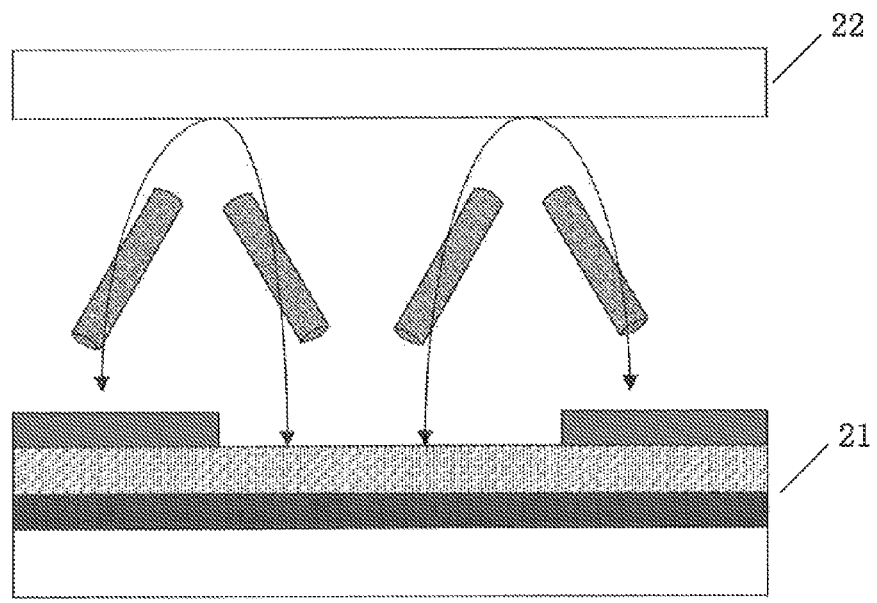
FIG. 2 is a schematic view showing the state of liquid crystal molecules of the display panel shown in FIG. 1 in the case of white grayscale.
Figure 3:
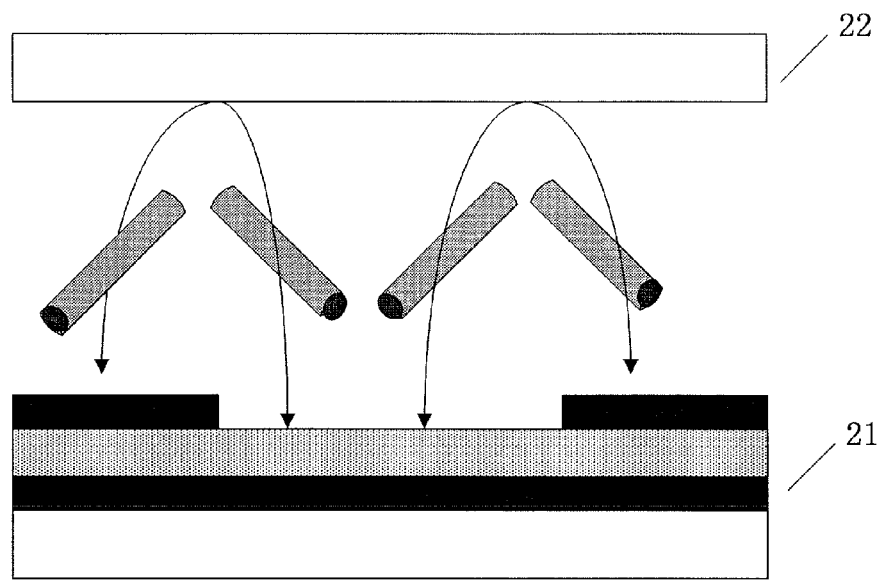
FIG. 3 is a schematic view showing the state of liquid crystal molecules of the display panel shown in FIG. 1 when they are changed from the state of white grayscale shown in FIG. 2 into a medium grayscale.

In order to make objects, technical details and advantages of the embodiments of the present invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Unless otherwise defined, the technical or scientific terminology used herein should have the same meaning as commonly understood by one of ordinary skill in the art to which this invention belongs. "First", "second" and the like used in specification and claims of the patent application of the invention do not show any order, number or importance, but are only used to distinguish different constituent parts. Likewise, the phrase such as "a," "an," "the" or the like does not indicate limitation in number, but specifies the presence of at least one. The phrase such as "comprise," "comprising," "include," "including", "contain" or the like means that an element or article ahead of this term encompasses element(s) or article(s) listed behind this term and its(their) equivalents, but does not preclude the presence of other elements or articles. The phrase such as "connection," "connected," or the like is not limited to physical or mechanical connection, but can include electrical connection, whether directly or indirectly. "Upper," "lower," "left," "right" or the like is only used to describe a relative positional relationship, and when the absolute position of a described object is changed, the relative positional relationship might also be changed accordingly.

An array substrate according to embodiments of the invention may include a plurality of gate lines and a plurality of data lines, and these gate lines and data lines cross over each other to thereby define pixel regions arranged in a matrix form. Each of the pixel regions includes a thin film transistor functioning as a switch element and a pixel electrode serving to control arrangement of liquid crystals. For example, for the thin film transistor of each pixel, its gate electrode is electrically connected to or integrally formed with a corresponding gate line, its source electrode is electrically connected to or integrally formed with a corresponding data line, and its drain electrode is electrically connected to or integrally formed with a corresponding pixel electrode. The following descriptions are mainly made on a single pixel unit or a plurality of pixel regions, but other pixel region(s) can be formed in the same way.

The embodiment provides an array substrate on which an array structure and a plurality of pixel regions are provided; each of the pixel regions includes a pixel electrode; at least part of a pixel region corresponding to the pixel electrode has an optical diffusion structure; the plurality of pixel regions include pixel regions corresponding to pixels of different colors; the optical diffusion structure is so arranged that reflectivity of light reflected from an optical diffusion structure of a pixel region, which corresponds to a pixel of a color having the longest light wavelength, is lower than reflectivity of light reflected from an optical diffusion structure of a pixel region, which corresponds to a pixel of another color.

If the array structure is a transflective array structure, then it is possible that only a part of the pixel region is in the optical diffusion structure, and the other part is in a light transmission structure; if it is a total-reflective array structure, then the pixel region is totally in the optical diffusion structure.

The optical diffusion structure may be a protruding structure, may also be a depressed structure, or a structure of diverse combination of concave and convex. Further, it may be a rough surface structure allowing diffusion of light in other form.

The pixel regions include pixel regions corresponding to pixels of different colors, for example, there may be a red pixel region, a blue pixel region and a green pixel region. Of course, depending on different actual situations, combinations of color types in other numbers may also be possible. For example, pixel regions of only two colors, pixel regions of three other colors, pixel regions of more colors, or the like are employed.

When liquid crystal molecules are changed from white grayscale state into a medium grayscale state, the anisotropy of refractivity of liquid crystals becomes larger, while the transmittance of red pixels with long light wavelength is also increased, causing a phenomenon of color deviation to take place. Thus, in the embodiment, the optical diffusion structure is so arranged that reflectivity of light reflected from an optical diffusion structure of a pixel region, which corresponds to a pixel of a color having the longest light wavelength, is lower than reflectivity of light reflected from an optical diffusion structure of a pixel region, which corresponds to a pixel of another color. For example, the pixel that has the longest light wavelength among the selected color pixels is a red pixel, and then an optical diffusion structure of the pixel region for the pixel electrode corresponding to a red pixel is arranged to be the structure having lower reflectivity of light. For example, when the optical diffusion structure is a protruding structure, a protruding angle of the protruding structure is set to be relatively small to some extent, so that reflectivity of red light on the diffusion structure is lower than reflectivity of other color on its corresponding diffusion structure. Thereby, the phenomenon of color deviation is eliminated or alleviated.

Preferably, in order to achieve an effect of eliminating color deviation better, it is also possible that diffusion structures corresponding to all of the color pixels are adjusted and improved in accordance with light wavelengths corresponding to them, so that a relative color deviation phenomenon for each of the colors can be alleviated, and therefore the object of overcoming color deviation can be achieved better.

Exemplarily, in the following embodiment, pixel electrodes in three colors of red, green and blue are included in a display substrate; that is, there are pixel regions in three colors of red, green and blue. The technical solutions will be described with reference to an example in which an embossing structure is selected for the optical diffusion structure. As will be appreciated by those skilled in the art, this is merely one preferred embodiment, and the choice of the kind and number of pixel colors therein, the specific structural choice of the optical diffusion structure and other equivalent-substitution technical characteristics, or reasonable variants and modifications can be known by those skilled in the art.

Figure 4:
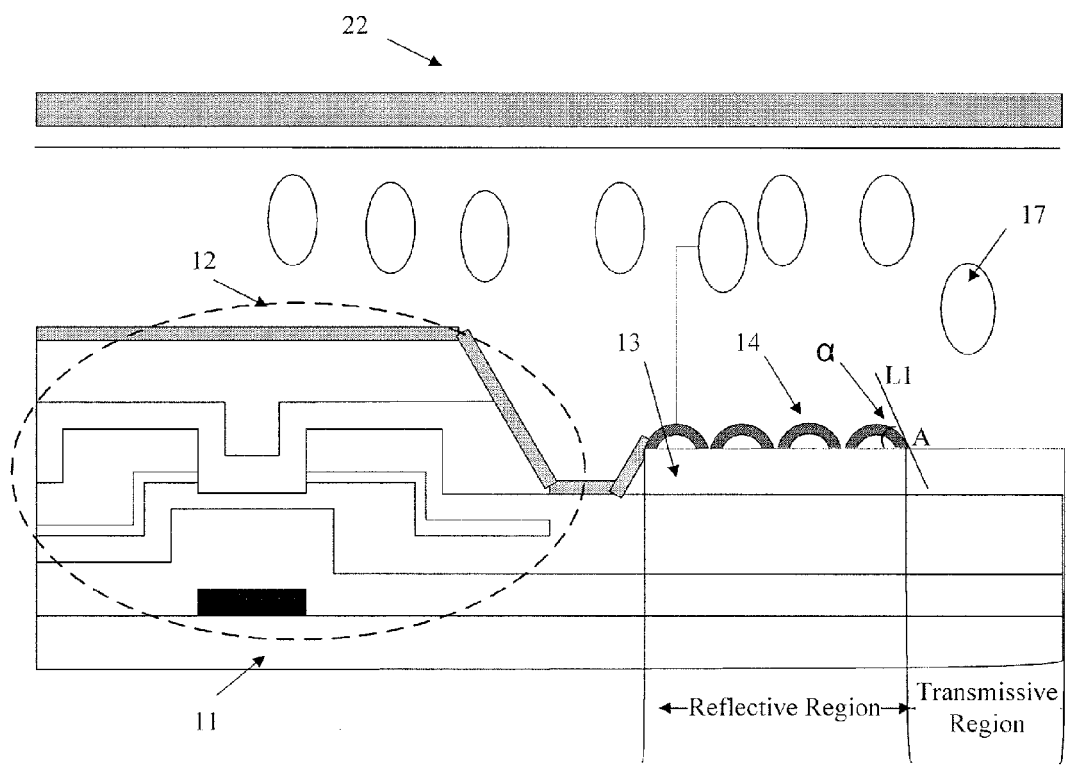
FIG. 4 is a structurally schematic view showing a display apparatus according to the invention.

As shown in FIG. 4, which is a structurally schematic view showing a display panel provided by an embodiment of the invention, an array substrate comprises: a first substrate 11; an array structure 12 (denoted by a dashed-line box in the figure), and a pixel electrode 13 that are formed on the first substrate 11. A pixel region corresponding to the pixel electrode 13 has an embossing structure 14; the pixel region is a red pixel region, a blue pixel region or a green pixel region; and a protruding angle of an embossing structure in a red pixel region is smaller than a protruding angle of an embossing structure in a blue pixel region, and is smaller than a protruding angle of an embossing structure in a green pixel region as well.

The protruding angle stated in this disclosure represents the extent to which an embossing structure sticks out, and the embossing structure is relatively flat in case of a smaller protruding angle. In the embodiment, as shown in FIG. 4, provided that the cross section of the embossing structure 14 is in the shape of a circular arc, the size of the protruding angle of the embossing structure 14 may be represented by the size of an angle $\alpha$; a point A shown in the figure is one end point of the circular arc, namely, the point where the outer edge of the circular arc intersects with the top surface of the pixel electrode 13. The angle $\alpha$ is the angle of osculation of the circular arc at the point A, i.e., an angle between a tangent (denoted by a straight line L1 in the figure) at the point A and a straight line representative of the top surface of the pixel electrode 13.

There are array structures the same as the array structure 12 on the first substrate 11, and each of the array structures has its corresponding pixel region, which may be a red pixel region, a blue pixel region or a green pixel region. The protruding angle of an embossing structure in the red pixel region is smaller than the protruding angle of an embossing structure in the blue pixel region, and is smaller than the protruding angle of an embossing structure in the green pixel region as well.

The angle $\alpha$ in FIG. 4 in the embodiment is merely an exemplary description, and it is not limited to the protruding angle of the embossing structure in the red pixel region, and may also be used to represent the protruding angle of an embossing structure in the blue pixel region or the green pixel region.

In the embodiment of the invention, reflectivity of the reflective layer in the red pixel region is reduced by decreasing the protruding angle of an embossing structure for a reflective region of the red pixel region, namely, reflectivity of the red pixel region is lower than that of the blue pixel region and the green pixel region. Thus, such a color deviation phenomenon as yellowish that occurs due to increasing of anisotropy of refractivity in the case of medium grayscales can be alleviated or eliminated, and thereby the quality of picture is improved. Because the stated color deviation phenomenon of yellowish is present both in a transflective liquid crystal display panel and a total-reflective liquid crystal display panel, the application of the technical solutions of the invention is not limited to the transflective array structure shown in FIG. 4, and they are suitable for a total-reflective array structure as well and the same technical effects can be achieved.

The pixel region to which the embodiment of the invention are applied may involve at least one pixel region, and each pixel region corresponds to one pixel electrode; and when a plurality of pixel regions are involved, the embossing structures for the pixel regions are many as well. Protruding angles of all embossing structures for red pixel regions are each smaller than protruding angles of all embossing structures for blue pixel regions, and are each smaller than protruding angles of all embossing structures for green pixel regions as well.

Preferably, in the above embodiment, the protruding angle of an embossing structure of a red pixel region may be in the range of 1 degree to 7 degrees.

Preferably, the protruding height of an embossing structure in a red pixel region may be in the range of 1.5 micrometers to 3.5 micrometers.

Preferably, the protruding angle of an embossing structure in a blue pixel region may be larger than or equal to the protruding angle of an embossing structure in a green pixel region.

Making the protruding angle of an embossing structure in a blue pixel region be larger than the protruding angle of an embossing structure in a green pixel region is also based on such a consideration that a color deviation phenomenon occurring due to difference between a blue light wavelength and a green light wavelength can be eliminated; the definition and description to the protruding angles of embossing structures for the blue pixel region and the green pixel region can be referred to the definition and description to the angle $\alpha$ stated above, including its equivalent substitution modes and variants under the same principle.

Preferably, protruding angles of embossing structures for the blue pixel region and the green pixel region each can be selected in the range of 5-13 degrees.

Further, it should be noted that, in the above array substrate, a portion denoted by the array structure 12 may be the same as an array structure of a conventional array substrate, details being omitted here.

It should be noted that, the description of the protruding angle of the embossing structure is not limited to the above one manner. For example, any other point on the outer edge line of the circular arc can be selected, and the tangent at the point and a corresponding angle can be utilized for representation. Certainly, in this case, when the protruding angle corresponding to a red pixel region is compared with the protruding angle corresponding to a pixel region of another color, the selected points of the embossing structures should be in correspondence to each other. For example, for each, a point on an arc in a same orientation is selected.

The comparison between angles is not the only way to represent the extent to which the embossing structure sticks out, but it is comparatively suitable for the case that the shape of a protrusion is in a circular arc or in an approximately circular arc. When the shape of the protrusion of the embossing structure is in irregular fluctuation, a ratio of the height of the protrusion to the horizontal width between the highest point of the protrusion and an edge point of the protrusion also can be used as a kind of comparative factor. The height of the protrusion, for example, may be a vertical distance between a horizontal line where the highest point of the protrusion of the embossing structure is located and a horizontal line where the lowest point of a recession of the embossing structure is located. In this case, accordingly, the ratio corresponding to an embossing structure in a red pixel region is smaller than the ratio corresponding to an embossing structure in a blue pixel region and the ratio corresponding to an embossing structure in a green pixel region. Preferably, the ratio corresponding to an embossing structure of the blue pixel region is larger than the ratio corresponding to an embossing structure of the green pixel region.

No matter what kind of comparison manner is selected, the comparison principle is the same, and is to make the protruding extent of an embossing structure in a red pixel region is less than the protruding extent for the blue pixel region and the protruding extent for the green pixel region. Preferably, the protruding extent of an embossing structure in a blue pixel region is made to be greater than the protruding extent for the green pixel region. Only in this way can the color deviation phenomenon be favorably eliminated or alleviated, thereby getting a better technical effect. Those skilled in the art can appreciate variants similar to the above and reasonable variances.

It should also be noted that, FIG. 4 is merely a schematic illustration, but not used to limit technical solutions of the invention. For example, the array structure included in the embodiment is not limited to the transflective structure, and may also be a total-reflective structure; the cross-sectional shape of the embossing structure is not limited to the regular, circular arc shape shown in the figure, and it may also be a protrusion of another kind of shape; and the size of the protruding angle is not limited to the angle size as shown in the figure as well.

Again, as shown in FIG. 4, an embodiment of the invention further provides a liquid crystal display apparatus, comprising: an array substrate, a color filter substrate 22 that cell-assembled with the array substrate, and a liquid crystal layer 17 located between the array substrate and the color filter substrate 22. The array substrate includes: a first substrate 11; an array structure 12 and a pixel electrode 13 that are formed on the first substrate 11. A part of the pixel region corresponding to the pixel electrode 13 has an embossing structure 14; the pixel region is a red pixel region, a blue pixel region or a green pixel region; and a protruding angle of an embossing structure in a red pixel region is smaller than a protruding angle of an embossing structure in a blue pixel region, respectively, and is smaller than a protruding angle of an embossing structure in a green pixel region as well.

Regarding the protruding angle, please refer to the descriptions made to the protruding angle in the embodiment of the above display panel, details being omitted here.

Preferably, the protruding angle of an embossing structure in the red pixel region may be in the range of 1 degree to 7 degrees.

Preferably, the protruding height of an embossing structure in the red pixel region may be in the range of 1.5 micrometers to 3.5 micrometers.

Preferably, the protruding angle of an embossing structure in the blue pixel region may be larger than or equal to the protruding angle of an embossing structure in the green pixel region. Furthermore, making the protruding angle of an embossing structure of the blue pixel region be larger than the protruding angle of an embossing structure of the green pixel region is also based on such a consideration that the color deviation phenomenon occurring due to difference between a blue light wavelength and a green light wavelength can be eliminated; the definitions and descriptions to protruding angles of embossing structures for the blue pixel region and the green pixel region can be referred to the definition and description to the angle $\alpha$ stated above, including its equivalent substitution modes and variants under the same principle.

Preferably, the protruding angles of embossing structures for the blue pixel region and the green pixel region each can be in the range of 5-13 degrees.

In the embodiment of the invention, the reflectivity of a reflective layer for the red pixel region is reduced by decreasing the protruding angle of an embossing structure for the reflective region of the red pixel region; that is, compared with reflectivity of the blue pixel region and that of the green pixel regions, reflectivity of the red pixel region is lower. Thus, the color deviation phenomenon such as yellowish) that occurs due to increasing of anisotropy of refractivity in medium grayscales can be alleviated or eliminated, and thereby the quality of picture is promoted.

The definition and description to the protruding angle in the present embodiment, as well as other description to comparison manner which is optional in addition to the angle, are the same as the corresponding descriptions in the embodiment of the above display panel.

Accordingly, the liquid crystal display apparatus in the embodiment may be a transflective liquid crystal display apparatus or a total-reflective liquid crystal display apparatus.

The descriptions made above are merely exemplary embodiments of the invention, but are not used to limit the protection scope of the invention. The protection scope of the invention is determined by attached claims.

The invention claimed is:

1. An array substrate, comprising:
   a first substrate;
   array structures and pixel electrodes that are formed on the first substrate, at least part of pixel regions corresponding to the pixel electrodes being in optical diffusion structures, and the pixel regions including pixel regions corresponding to pixels of different colors;
   wherein the optical diffusion structures are so arranged that reflectivity of light reflected from an optical diffusion structure of a pixel region, which corresponds to a pixel of a color having the longest light wavelength, is lower than reflectivity of light reflected from an optical diffusion structure of a pixel region, which corresponds to a pixel of another color;
   wherein the pixel regions include a red pixel region, a blue pixel region and a green pixel region;
   a protruding angle of each embossing structure of the diffusion structure in the red pixel region is smaller than a protruding angle of each embossing structure of the diffusion structure in the blue pixel region and a protruding angle of each embossing structure of the diffusion structure in the green pixel region, respectively
   the protruding angle is an angle between a tangent line of the embossing structure at an intersecting point with the top surface of the pixel electrode and a straight line representative of the top surface of the pixel electrode; and
   the embossing structures in each of the red pixel region, the blue pixel region and the green pixel region are uniform.

2. The array substrate claimed as claim 1, wherein the optical diffusion structure of the pixel region which corresponds to a pixel of another color is so arranged that reflectivity of light reflected from an optical diffusion structure of a pixel region, which corresponds to a color pixel with a first light wavelength, is lower than reflectivity of light reflected from an optical diffusion structure of a pixel region, which corresponds to a color pixel with other light wavelength, wherein the first light wavelength is larger than the other light wavelength.

3. The array substrate claimed as claim 1, wherein the protruding angle of the embossing structure of the red pixel region is in the range of 1 degree to 7 degrees.

4. The array substrate claimed as claim 1, wherein the protruding height of the embossing structure of the red pixel region is in the range of 1.5 micrometers to 3.5 micrometers.

5. The array substrate claimed as claim 1, wherein the protruding angle of the embossing structure in the blue pixel region is larger than or equal to the protruding angle of the embossing structure in the green pixel region.

6. The array substrate claimed as claim 1, wherein the protruding angle of the embossing structure in the blue pixel region and the protruding angle of the embossing structure in the green pixel region each are selected within the range of 5-13 degrees.

7. A liquid crystal display apparatus, comprising:
   an array substrate;
   a color filter substrate cell-assembled with the array substrate; and
   a liquid crystal layer located between the array substrate and the color filter substrate;
   wherein the array substrate comprises a first substrate and array structures and pixel electrodes that are formed on the first substrate; at least part of pixel regions corresponding to the pixel electrodes are in optical diffusion structures; the pixel regions include pixel regions corresponding to pixels of different colors; wherein the optical diffusion structures are so arranged that reflectivity of light reflected from an optical diffusion structure of a pixel region, which corresponds to a pixel of a color having the longest light wavelength, is lower than reflectivity of light reflected from an optical diffusion structure of a pixel region, which corresponds to a pixel of another color;
   wherein the pixel regions include a red pixel region, a blue pixel region and a green pixel region;
   a protruding angle of each embossing structure of the diffusion structure the red pixel region is smaller than a protruding angle of each embossing structure of the diffusion structure the blue pixel region and a protruding angle of each embossing structure of the diffusion structure the green pixel region, respectively;
   the protruding angle is an angle between a tangent line of the embossing structure at an intersecting point with the top surface of the pixel electrode and a straight line representative of the top surface of the pixel electrode; and
   the embossing structures in each of the red pixel region, the blue pixel region and the green pixel region are uniform.

8. The liquid crystal display apparatus claimed as claim 7, wherein the optical diffusion structure of the pixel region which corresponds to a pixel of another color is so arranged that reflectivity of light reflected from an optical diffusion structure of a pixel region, which corresponds to a color pixel with a first light wavelength, is lower than reflectivity of light reflected from an optical diffusion structure of a pixel region, which corresponds to a color pixel with other light wavelength, wherein the first light wavelength is larger than the other light wavelength.

9. The liquid crystal display apparatus claimed as claim 7, wherein the protruding angle of the embossing structure of the red pixel region is in the range of 1 degree to 7 degrees.

10. The liquid crystal display apparatus claimed as claim 7, wherein the protruding height of the embossing structure of the red pixel region is in the range of 1.5 micrometers to 3.5 micrometers.

11. The liquid crystal display apparatus claimed as claim 7, wherein the protruding angle of the embossing structure of the blue pixel region is larger than or equal to the protruding angle of the embossing structure of the green pixel region.

12. The liquid crystal display apparatus claimed as claim 7, wherein the protruding angle of the embossing structure of the blue pixel region and the protruding angle of the embossing structure of the green pixel region each are selected within the range of 5-13 degrees.

\* \* \* \* \*